United States Patent
Dominguez (10) Patent No.: US 10,125,800 B1
(45) Date of Patent: Nov. 13, 2018

(54) CAM POSITIONING OF MACHINERY SYSTEM

(71) Applicant: Bruce Dominguez, Drexel Hill, PA (US)

(72) Inventor: Bruce Dominguez, Drexel Hill, PA (US)

(*) Notice: Subject to any disclaimer, the term of this patent is extended or adjusted under 35 U.S.C. 154(b) by 0 days.

(21) Appl. No.: 15/920,853

(22) Filed: Mar. 14, 2018

Related U.S. Application Data (63) Continuation-in-part of application No. 15/618,285, filed on Jun. 9, 2017, now abandoned.

(60) Provisional application No. 62/347,782, filed on Jun. 9, 2016.

(51) Int. Cl.
| | |
|---|---|
| *F16B 5/02* | (2006.01) |
| *F16B 43/00* | (2006.01) |
| *F16B 35/00* | (2006.01) |
| *B25B 13/48* | (2006.01) |

(52) U.S. Cl.
CPC ............ *F16B 5/025* (2013.01); *B25B 13/481* (2013.01); *F16B 35/005* (2013.01); *F16B 43/00* (2013.01); *Y10T 29/49895* (2015.01); *Y10T 403/335* (2015.01); *Y10T 403/7041* (2015.01); *Y10T 403/7069* (2015.01); *Y10T 403/76* (2015.01)

(58) Field of Classification Search
CPC ........ B25B 13/481; F16B 2/18; F16B 5/0024; F16B 5/008; F16B 5/0088; F16B 5/025; F16B 19/02; F16B 35/005; F16B 39/128; F16B 43/00; Y10T 29/49895; Y10T 29/49947; Y10T 403/335; Y10T 403/7041; Y10T 403/7069; Y10T 403/75; Y10T 403/76

USPC ............... 403/168, 362, 374.4, 408.1, 409.1, 403/DIG. 8; 411/398; 29/464, 525.01; 248/649, 650

See application file for complete search history.

(56) References Cited

U.S. PATENT DOCUMENTS

| | | | |
|---|---|---|---|
| 979,207 A | 12/1910 | Sasaman |
| 1,020,178 A | 3/1912 | Battin |
| 1,098,219 A | 5/1914 | Boles |
| 1,213,599 A | 1/1917 | Dow |

(Continued)

FOREIGN PATENT DOCUMENTS

| | | |
|---|---|---|
| DE | 10008828 A1 | 9/2001 |
| FR | 2071545 A5 | 9/1971 |

(Continued)

OTHER PUBLICATIONS

"Bevel and Chamfer: What's the Difference." JF Berns. Nov. 5, 2015, [online], [retrieved on Apr. 18, 2018] Retrieved from the Internet <URL: https://www.jfberns.com/post/bevel-and-chamfer-whats-the-difference>.*

(Continued)

*Primary Examiner* — Josh Skroupa
(74) *Attorney, Agent, or Firm* — Gerry J. Elman; Elman Technology Law, P.C.

(57) ABSTRACT

This invention uses disc shaped cams in enlarged hoes in machine feet to allow a machine to be moved and properly installed to the bedplate. Once the machine is in the proper location, the cams are locked into place with a set screw which prevents the cams from rotating and the machine from moving. The machine foot is then secured to the base by a washer and the manufacturer's specified anchor bolt is torqued to the proper value.

15 Claims, 6 Drawing Sheets

(56) References Cited

U.S. PATENT DOCUMENTS

| | | | |
|---|---|---|---|
| 1,854,277 | A | 4/1932 | Schatz |
| 2,559,833 | A | 7/1951 | Stellin |
| 3,385,624 | A | 5/1968 | Baclini |
| 4,309,123 | A | 1/1982 | Moore |
| 4,613,000 | A | 9/1986 | Moore |
| 5,141,357 | A | 8/1992 | Sherman et al. |
| 5,374,135 | A | 12/1994 | Folsom et al. |
| 6,848,853 | B2 | 2/2005 | Yamada |
| 7,455,471 | B2 | 11/2008 | Gawehn |
| 8,024,841 | B2 | 9/2011 | Shen |
| 9,233,589 | B1 | 1/2016 | Miller |
| 2011/0116897 | A1 | 5/2011 | Carrasco |

FOREIGN PATENT DOCUMENTS

| | | | | |
|---|---|---|---|---|
| JP | 2003310571 A | * | 11/2003 | ............. F16B 5/025 |
| JP | 2003310571 A | | 11/2003 | |
| WO | 2013084134 A1 | | 6/2013 | |

OTHER PUBLICATIONS

Renfro, Bruce, "The art of bevel cutting" Jan. 2, 2014. The Fabricator. Retrieved on Sep. 11, 2007. Retrieved from the Internet: <URL:http://www.thefabricator.com/article/cadcamsoftware/the-art-of-bevel-cutting>.

* cited by examiner

CAM POSITIONING OF MACHINERY SYSTEM

CROSS-REFERENCE TO RELATED APPLICATIONS

This application is a continuation-in-part of U.S. patent application Ser. No. 15/618,285, filed Jun. 9, 2017, which in turn claims priority to U.S. Provisional Patent Application 62/347,782, filed Jun. 9, 2016. Both of these applications are hereby incorporated by reference.

BACKGROUND OF THE INVENTION

The invention relates to the installation of a machine where accurate placement of the machine on the foundation is critical. When installing a machine, a bedplate with bolt holes for the machine is already set in place on the foundation. It is often necessary to set the machine to a very accurate location on the foundation bedplate to allow for connections to other parts of a system being installed. The location of the machine may be required to be within a few thousandths of an inch (hundredths of a millimeter) of a particular location on the bedplate. The machine bolt holes are oversized to allow for some adjustment on the bedplate. After being set in the desired position, the machine feet are bolted to the bedplate to the maximum torque value of the bolts to prevent the machine from loosening on the bedplate. The machine is then dowelled to the bedplate to prevent lateral movement of the machine feet within the bolt holes.

Problems arise because the bolt clearance in the standard hold down bolt hole is sometimes too small to allow the machines to be set at the proper location. Further, doweling in a field location is time-consuming and expensive.

A need exists for a system that can be easily installed in the field which allows increased movement for the correct placement of the machine and a dowel-free way to fix the machine to prevent lateral movement.

SUMMARY OF THE INVENTION

The invention is a system for securing a machine to a bedplate.

In the prior art, the bolt holes in the feet of machines are formed to have only slightly larger diameters than the bolts themselves. This leaves very little adjustment when moving the machine to the desired location on the previously installed foundation bedplate.

In this invention, the bolt holes in the feet of the machine have a much larger diameter. Two disc-shaped cams and a locating stud are put in the enlarged bolt hole. The diameters of the bolt hole and cams are machined to be within a few thousandths of an inch (hundredths of a millimeter) of each other. While precision machining is costly there is only a limited amount of holes, and the cost is offset by the time saved in installation.

The larger of the cams fits inside the enlarged foot bolt hole. This outer cam has an opening large enough that the smaller inner cam just fits within it. The smaller inner cam has an opening only slightly larger than the locating stud. Both cams have at least two divots or holes on top so that they can be turned with a spanner wrench.

The sequence of installation with this invention is as follows. The installer sets the machine on the foundation bedplate with the machine feet holes approximately centered on the existing bedplate holes. He next moves the machine to its correct position. Then into each foot of the machine, the user puts the outer cam into the foot's bolt hole. He puts the locating stud through the cam and screws it into the bolt hole in the bedplate. The user then places the inner cam onto the locating stud. After installing the cams as described above, the user rotates the cams on the locating stud until the chamfer on the inner cam begins to engage with the outer cam. The inner cam can then be inserted into the outer cam.

The fixed hole in the machine foot in the prior art installation now becomes an adjustable hole which, by rotating the cams, can be moved anywhere within the enlarged machine hole to the limits of the sum of the offsets. A typical offset of a cam would be one-quarter inch, which would allow the machine foot to be moved one-half inch in any direction from the bedplate hole center for machine placement, as opposed to the current ³⁄₁₆" movement allowed. After the final placement of the machine, the machine foot hole adjustable hole must be located to within a few thousandths of an inch over the bedplate hole. The locating stud becomes an indispensable aide to facilitate this because rotating the cams onto the locating stud puts the bolt hole in the inner cam directly over the hole.

The user then puts the set screw into a hole drilled into the side of the foot. The set screw is inserted until it engages the outer perimeter of the larger cam and is tightened. This prevents the cams from rotating, locking them in position, which prevents any lateral movement of the foot and thereby eliminating the need to dowel.

After using the invention to properly locate the machine and lock it in place laterally, the user then completes the motor installation by removing the locating stud and installing a washer which will span the enlarged foot hole and lay directly on the machine foot. The cams, being thinner than the foot, do not affect the placement of the washer directly on the foot. Further the washer typically has an offset hole to maximize the surface contact between the washer and machine foot. The manufacturer's recommended bolt is installed and torqued to the proper specification.

One aspect of the invention is an assembly for bolting a machine to a bedplate comprising:
  an outer cam having an outer cam opening offset from the center of the outer cam;
  an inner cam formed to fit within the outer cam opening, the inner cam having an inner cam opening offset from the center of the inner cam, the bottom of the outer edge of the inner cam being chamfered, and the bottom of the inner edge of the inner cam being chamfered;
  a locating stud;
  a set screw;
  a washer having a diameter greater than the diameter of the outer cam; and an anchor bolt.

Another aspect of the invention is the assembly described above, wherein the outer edge of the outer cam has a groove.

Another aspect of the invention is the assembly described in any aspect above, wherein the outer cam has at least two divots on its top side.

Another aspect of the invention is the assembly described in any aspect above, wherein the inner cam has at least two divots on its top side.

Another aspect of the invention is the assembly as described in any aspect above, wherein the bolt hole of the washer is offset from its center.

Another aspect of this invention is a method for installing a machine to a previously-installed bedplate, the machine comprising:
  at least one machine foot, each machine foot having a machine foot opening;
  the method comprising:

setting the machine on a bedplate;
moving the machine on the bedplate so that the machine is properly aligned, the machine foot openings being positioned over bedplate bolt holes;
for each machine foot opening:
  setting an outer cam in the machine foot opening, the outer cam having an outer cam opening offset from the center of the outer cam;
  screwing a locating stud through the machine foot opening and outer cam opening into the bedplate bolt hole;
  rotating the outer cam to maximize the distance between the locating stud and the inside perimeter of the outer cam opening;
  placing an inner cam on the locating stud and atop the outer cam, the inner cam being formed to fit within the outer cam opening, the inner cam having an inner cam opening offset from the center of the inner cam through which the locating stud is located, the bottom of the outside perimeter of the inner cam being chamfered;
  rotating the outer cam and the inner cam until they engage and the inner cam slides into the outer cam;
  screwing a set screw into a set screw hole on the side of the machine foot until it presses against a groove in the outer perimeter of the outer cam;
  removing the locating stud from the bolt hole;
  placing a washer over the outer cam and the inner cam, the washer having a diameter greater than the diameter of the outer cam and a hole offset from center;
  placing a bolt through the washer and inner cam opening into the bedplate bolt hole;
  bolting the washer and the machine foot to the bedplate.
Another aspect of the invention is the method described above, further comprising:
  for each machine foot, expanding to the standard machine foot opening so that the outer cam fits within the machine foot opening.
Another aspect of the invention is the method as described in any aspect above, further comprising:
  for each machine foot, drilling a hole into the side of the machine foot running from the side of the machine foot to the machine foot opening.
Another aspect of the invention is the method as described in any aspect above, further comprising:
  after installing the hold-down bolt, further tightening the set screw.
Another aspect of the invention is the method described in any aspect above, wherein the outer cam has at least two divots on its top side, and wherein the step of rotating the outer cam to maximize the distance between the locating stud and the edge of the outer cam opening comprises turning a spanner wrench whose prongs are within the divots of the outer cam.
Another aspect of the invention is the method described in any aspect above, wherein the outer cam has at least two divots on its top side, two of the divots are tapped to allow a cam pulling device to be attached to them.
Another aspect of the invention is the method described in any aspect above, wherein the inner cam has at least two divots on its top side, and wherein the step of rotating the outer cam and the inner cam until they engage comprises turning a spanner wrench whose prongs are within the divots of the inner cam.
Another aspect of the invention is the method described in any aspect above, wherein the inner cam has at least two divots on its top side, two of the divots are tapped to allow a cam pulling device to be attached to them.
Another aspect of the invention is the method described in any aspect above, wherein the outside perimeter of the outer cam has a groove, and wherein the step of screwing a set screw into a set screw hole to press the outside perimeter of the outer cam comprises engaging the groove of the outer cam.

DETAILED DESCRIPTION OF THE INVENTION

Equipment manufacturers often require that, when a machine is installed, it be positioned within strict limits of other equipment to avoid vibration and wear. Sometimes very accurate positioning is necessary because connection between machine couplings may require positioning to a few thousandths of an inch (5 hundredths of a millimeter).

Figure 1:
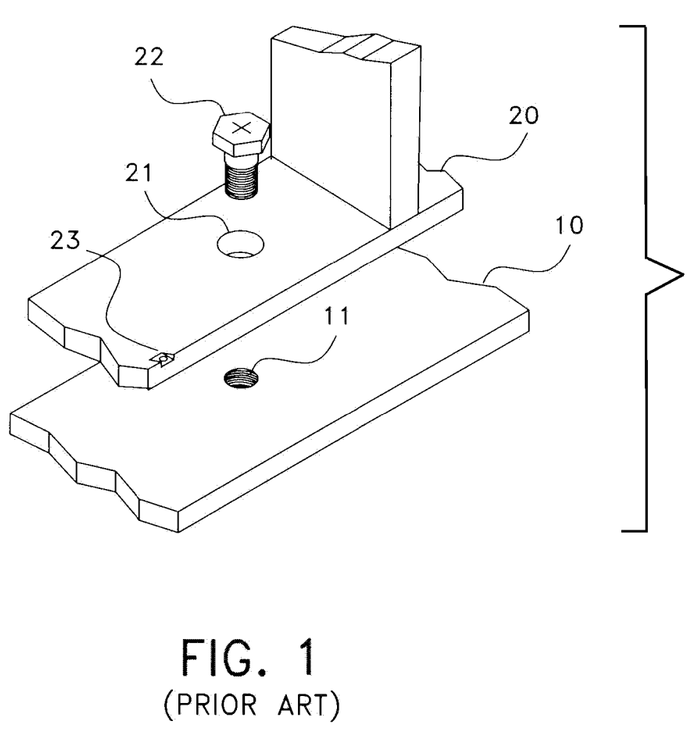
FIG. 1 is an exploded view of a prior art installation of a machine foot.

FIG. 1 shows an exploded view of the prior art method of installing a machine to a bedplate. In the prior art, the procedure is:
  The Bedplate 10 for the machine is set on the equipment foundation. A bedplate may hold one or multiple machines.
  The Bedplate 10 is aligned to the system's external equipment, e.g., piping for a pump, ductwork for an air compressor, or a vent or chimney for a fan.

Other bedplates, if any, are aligned to the first bedplate and each other.

The bedplate(s) are usually set in concrete before the machines are installed.

There are tapped Bolt Holes 11 in the Bedplate(s) 10 which are supposed to match the Bolt Hole 21 pattern in the Feet 20 of the machine(s).

When installing a machine, the Holes 21 in the feet of the machine are aligned with the Holes 11 in the bedplate. The machine is set down on the Bedplate 10 with each Bolt Holes 21 centered on its corresponding tapped Bedplate Bolt Holes 11.

The machine is then moved to its correct position and secured by the Hold-down Bolt 22 which is then torqued to the correct value.

The Foot 20 of the machine is doweled to the Bedplate 10 using the Dowel Pilot Hole 23 in the Machine Foot 20.

In the prior art, the diameters of the Bolt Holes 21 for the Hold-down Bolts 22 in the Feet 20 of machines are usually ⅜" (10 mm) greater than the Hold-down Bolt 22 itself. With the Feet 20 centered on the Holes 11 and the Hold-down Bolt 22 installed, a Foot 20 may move 3/16" (5 mm) parallel to the Bedplate 10 in any direction. This can be a problem if the pattern of the Holes 11 in the bedplate 10 is slightly different than the pattern in the Machine Feet 20. Additionally when positioning, the machine may need to move more than 3/16" (5 mm); this frequently occurs in longer machines, where a small angular movement at one end is magnified at the other end.

Also in prior art, doweling a machine foot is a time-consuming process due to the size of the dowel holes to be drilled, the possible need to drill dowel holes at an angle, and the usual interference of piping and other obstructions.

In the present invention, a lockable cam assembly locates a machine on a fixed bedplate so that the machine has a greater range of movement and need not be doweled.

Figure 2:
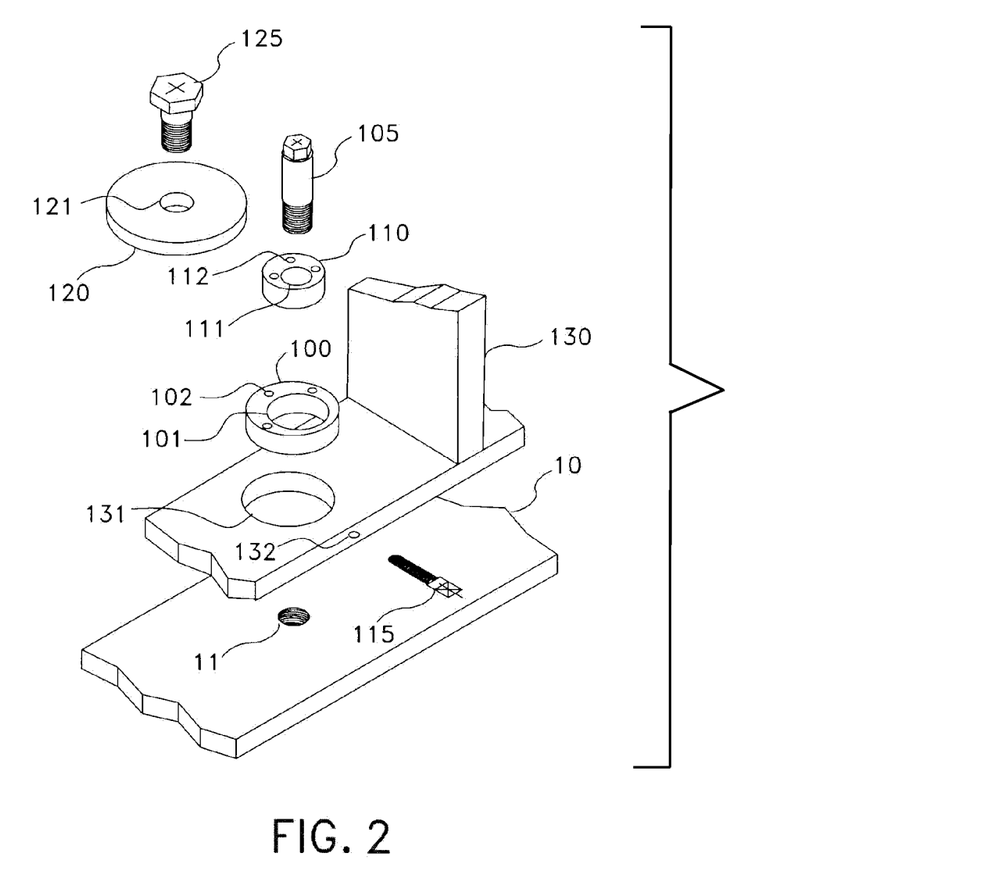
FIG. 2 is an exploded view of an installation of a machine foot using the invention.
Figure 3A:
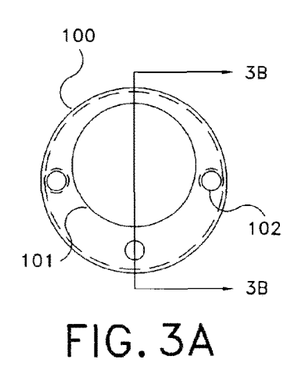
FIG. 3A is a plan view of the outer cam.
Figure 3B:
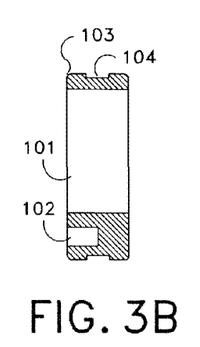
FIG. 3B is a cross-section view of the outer cam.

FIG. 2 shows an exploded view of the parts of the assembly. FIGS. 3A and 3B show the Outer Cam 100, a metal disc whose diameter is about 0.002 inches (0.05 mm) smaller than the diameter of the Foot Hole 131 and whose height is about 0.015 inches (0.25 mm) shorter than the Machine Foot 130. The shorter height ensures that the Hold-down Washer 120 sits flush on the Machine Foot 130 and does not touch the cams. The Outer Cam 100 has a large Hole 101 offset from center into which the Inner Cam 110 will be placed.

FIG. 3A shows the Outer Cam 100 from the top down. FIG. 3B shows a cross-section of the Outer Cam 100. Because of the tight clearance, the disc has filleted top and bottom outer Edges 103 to allow easier insertion into the Foot Hole 131. In preferred embodiments, there is a Groove 104 in the outer perimeter of the Outer Cam 100 so that the Set Screw 115 will not damage the surface of the cam perimeter, which would make it more difficult to remove the Outer Cam 100. In preferred embodiments, the Outer Cam 100 has three Holes or Divots 102 on the top of the disc to allow the user to use a spanner wrench to rotate the Outer Cam 100. Two of the Holes 102 are tapped to allow for the attachment of a pulling device that may be required due to the tight clearances that might make removing the cam difficult. In alternative embodiments, there are no holes or divots on top of the Outer Cam 100.

FIG. 2 also shows the Inner Cam 110, a steel disc whose diameter is about 0.002 inches (0.05 mm) smaller than the Hole 101 in the Outer Cam 100. The Inner Cam 110 has a Hole 111 offset from center whose diameter is about 0.002 inches (0.05 mm) greater than the Hold-Down Bolt 125. The height of the Inner Cam 110 is the same as the Outer Cam 100.

Figure 3C:
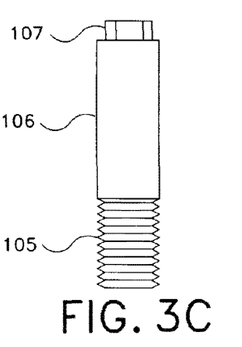
FIG. 3C is an elevation view of the locating stud.
Figure 3D:
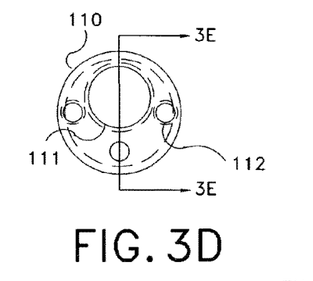
FIG. 3D is a plan view of the inner cam.
Figure 3E:
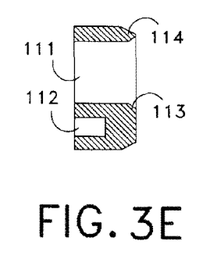
FIG. 3E is a cross-section view of the inner cam.

FIG. 3D shows the Inner Cam 110 from the top down. FIG. 3E shows a cross-section of the Inner Cam 110. The bottom inside Edge 113 of the Hole 111 is chamfered to avoid any rough edges of vertical alignment shims around the Bolt Hole 11. Rough edges could prevent the Inner Cam 110 from sitting flat on the shims. The bottom outer Edge 114 of the Inner Cam 110 is chamfered in order to help seating the Inner Cam 110 into the Outer Cam 100. In preferred embodiments, the Inner Cam 110 has three Holes or Divots 112 on the top of the disc so that a user can rotate the Inner Cam 110 with a spanner wrench. Two of the Holes 112 are tapped to allow for the attachment of a pulling device, due to the tight clearances that might make removing the cam difficult. In alternative embodiments, there are no holes or divots on top of the Inner Cam 110.

FIG. 3C shows a side view of the Locating Stud 105 shown in FIG. 2. The Locating Stud 105 has the same thread size and body diameter as the Hold-down Bolt 120. The length of the Locating Stud 105 is at least twice the height of the Machine Foot 130. The Top 107 of the Locating Stud 105 is formed so that a user may use a wrench to aid removal.

FIG. 2 shows the Hold-down Washer 120: a steel disc with a thickness similar to the height of the machine Foot 130. FIG. 3G shows a top-down view of the Washer 120. FIG. 3H shows a cross-section of the Washer 120. The diameter of the Washer 120 is about 1 inch (25 mm) greater than the diameter of the Outer Cam 100. In preferred embodiments, the Washer 120 has a Hole 121 offset from center by the same amount as the Hole 111 is offset in the Inner Cam 110. In alternative embodiments, the Hole 121 is centered in the Washer 120. The Washer Hole 121 is the same size as the Hole 111 in the Inner Cam 110. To allow a standard bolt to tighten flush on the Washer 120, the top and bottom inner Edges 122 of the Hole 121 are chamfered.

Figure 3F:
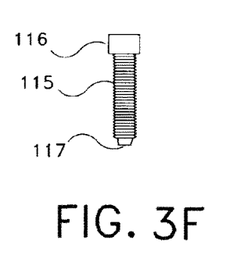
FIG. 3F is an elevation view of the set screw.
Figure 3G:
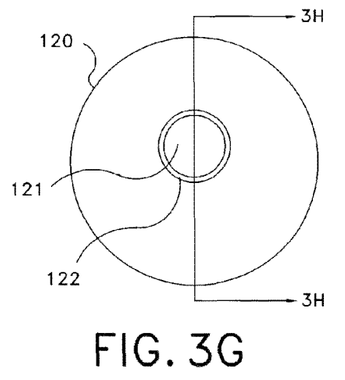
FIG. 3G is a plan view of the hold-down washer.
Figure 3H:
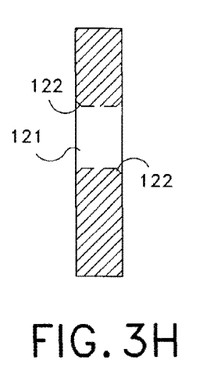
FIG. 3H is a cross-section view of the hold-down washer.

FIG. 3F shows the Set Screw 115 used in FIG. 2. The Set Screw 115 has a Square Head 116 and a Cupped Point 117. The size and the length of the Set Screw 115 are determined by manufacturing parameters. The length must allow the Set Screw to completely fill the Set Screw Hole 132 and contact the outer perimeter or Groove 104 of the Outer Cam 100.

Figure 3I:
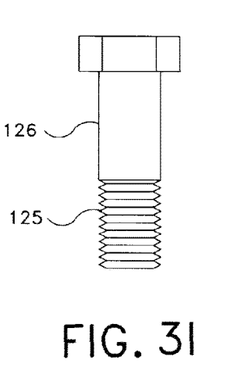
FIG. 3I is an elevation view of the hold-down bolt.

FIG. 2 shows the Hold-down Bolt 125 shown in FIG. 3I. The size and grade of the Bolt 125 is determined by the machine manufacturer. The length of the bolt Body 126 is slightly shorter than the combined height of the machine Foot 130 and the Hold-down Washer 120. The length of the threaded portion of the Bolt 125 is the either the same as the height of the Bedplate 10 or 1.5 times the diameter of the Bolt 125, whichever is less.

FIGS. 4A-4H show the method of installing machines using this invention. The foundation Bedplate 10 of the machine is manufactured and installed in the usual manner.

The system used in this invention requires that the standard Machine Foot 20 be modified. The Bolt Hole 21 of a standard Foot 20 (see FIG. 1) is enlarged from its original diameter so the Foot 130 for the new system has a Hole 131 slightly larger than the diameter of the Outer Cam 100. A Set Screw Hole 132 is drilled into the side of the foot 130 then tapped for the Set Screw 115. The Set Screw Hole 132 is in line with the centerline of Foot Hole 131 and runs from the side of the Foot 130 into the Foot Hole 131. The Dowel Hole 23 is eliminated.

Figure 4A:
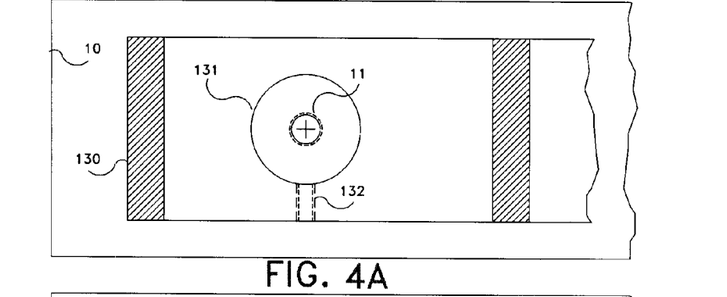
FIG. 4A is a plan view of the first steps of the method of installation of the invention: the machine is placed and centered on the bedplate.

FIG. 4A shows the machine set on the foundation Bedplate 10 with the Hole 131 in the Machine Foot 130 centered over the Bedplate Bolt Hole 11.

Figure 4B:
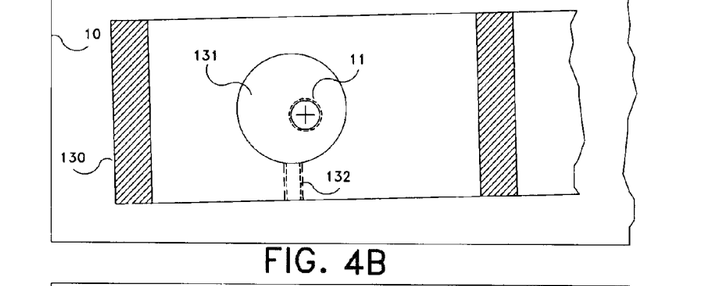
FIG. 4B is a plan view of the second step of the method of installation of the invention: the machine is moved to its correct position.

FIG. 4B shows the machine's machine Foot 130 on the bedplate 10 after the machine has been set in the correct position.

Figure 4C:
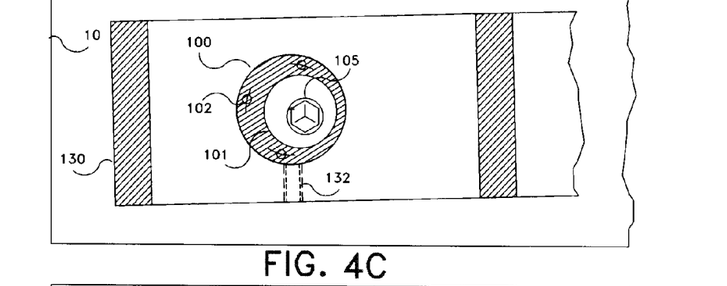
FIG. 4C is a plan view of the third step of the method of installation of the invention: Cam A and the Locating Stud are installed and Cam A is set to its approximate position.

FIG. 4C shows the machine Foot 130 being prepared to be secured. The user places the Outer Cam 100 into the Hole 131 of the Machine Foot 130. The Locating Stud 105 is then screwed into the Bolt Hole 11 of the Bedplate 10.

Figure 4D:
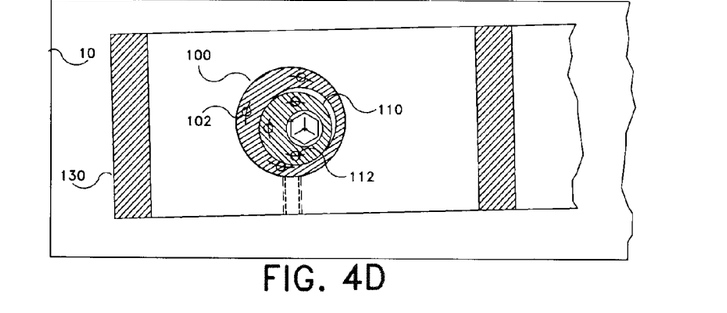
FIG. 4D is a plan view of the fourth step of the method of installation of the invention: Cam B is put on the Locating Stud and set onto Cam A.

In FIG. 4D, the Inner Cam 110 is put on the Locating Stud 105 and slid down to rest on the Outer Cam 100.

Figure 4E:
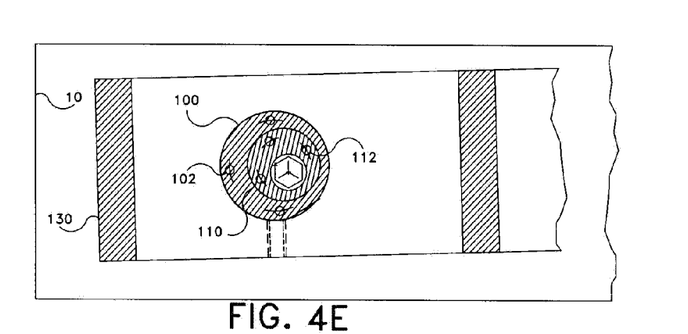
FIG. 4E is a plan view of the fifth step of the method of installation of the invention: Cam B is set into Cam A.

FIG. 4E shows the Inner Cam 110 set within the opening of the Outer Cam 100. To achieve this, the Cams 100 and 110 must be rotated. The Outer Cam 100 can be rotated with a spanner wrench while the Inner Cam 110 can usually be rotated by hand. The Cams 100 and 110 are rotated until the chamfered outer Edge 114 of the Inner Cam 110 starts to engage the opening of the Outer Cam 100. The chamfered Edge 114 of the Inner Cam 110 acts as a wedge, enabling the Cams 100 and 110 to center themselves and Inner Cam 110 to be seated with some slight downward pressure.

Figure 4F:
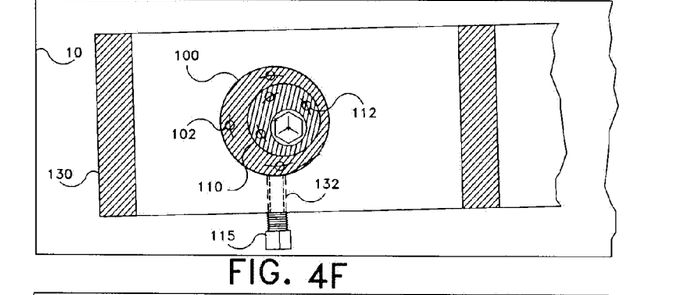
FIG. 4F is a plan view of the sixth step of the method of installation of the invention: the set screw is put into the foot.

In FIG. 4F, the Set Screw 115 is installed into the Hole 132 in the Foot 130 and it is tightened against the outer edge or Groove 104 of the Outer Cam 100. This tightens the Outer Cam 100 in the foot hole 131 and, because of the close tolerance between parts, prevents both Cams 100 and 110 from moving.

Figure 4G:
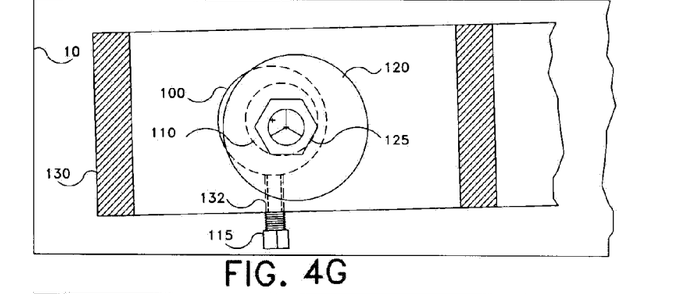
FIG. 4G is a plan view of the seventh of the method of installation of the invention:
  the bolt and washer are put on the foot.

In FIG. 4G, the user removes the Locating Stud 105, places the Hold-down Washer 120 over the Cams 100, 110, and then begins to screw the Hold-down Bolt 125 through the Hold-down Washer 120 and the Cams 100 and 110 into the bolt hole 11 of the bedplate.

Figure 4H:
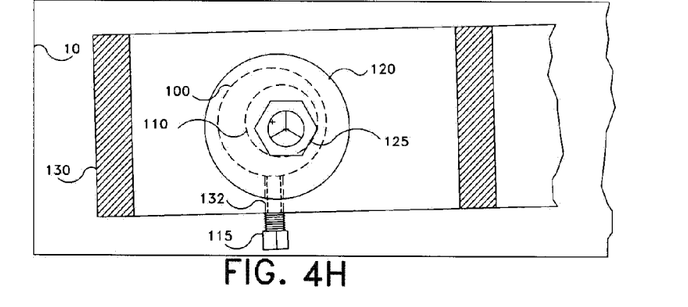
FIG. 4H is a plan view of a completed installation of the invention with the washer position optimized and the bolt tightened.

FIG. 4H shows that, before tightening the Hold-down Bolt 125, the Hold-down Washer 120 should be rotated until it covers the maximum amount of area over the Outer Cams 100 (here shown in dotted lines). The Hold-down Bolt 125 is then torqued to its proper value and, if necessary, the Set Screw 115 is then given a final tightening. The installation is complete.

Figure 5:
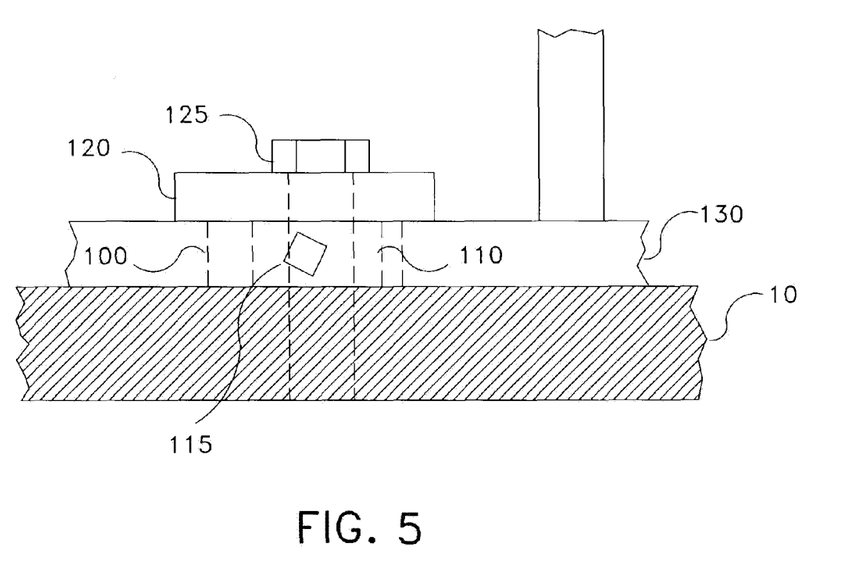
FIG. 5 is a side elevation view of a completed installation of the invention.

FIG. 5 shows the completed installation from the side of the Machine Foot 130 where the Set Screw 115 is installed.

Those skilled in the art will understand that measurement equivalents between S.I. and imperial systems are approximate and that when a measurement is given in imperial units, the invention can also operate in the near equivalent measurements in S.I., and vice versa.

I claim:

1. A method for installing a machine, the machine comprising:
at least one machine foot, each machine foot having a machine foot opening;
the method comprising:
setting the machine on a bedplate;
moving the machine on the bedplate so that the machine is properly aligned, the machine foot openings being positioned over bedplate bolt holes;
for each machine foot opening:
setting an outer cam in the machine foot opening, the outer cam having an outer cam opening offset from the center of the outer cam;
screwing a locating stud through the machine foot opening and the outer cam opening into the bedplate bolt hole;
rotating the outer cam to maximize the distance between the locating stud and the edge of the outer cam opening;
placing an inner cam on the outer cam, the inner cam being formed to fit within the outer cam opening, the inner cam having an inner cam opening offset from the center of the inner cam, the bottom of the outer edge of the inner cam being chamfered;
rotating the outer cam and the inner cam until they engage;
placing downward pressure on the inner cam to insert into the outer cam opening;
on the side of the machine foot, screwing a set screw into a set screw hole to press the outer edge of the outer cam;
removing the locating stud from the bolt hole;
placing a washer over the outer cam and the inner cam, the washer having a diameter greater than the diameter of the outer cam; and
bolting the washer and the machine foot to the bedplate through the inner cam opening into the bedplate bolt hole.

2. The method of claim 1, further comprising:
for each machine foot, enlarging the machine foot opening so that the outer cam fits within the machine foot opening.

3. The method of claim 1, further comprising:
for each machine foot, drilling a hole into the side of the machine foot running from the side of the machine foot to the machine foot opening.

4. The method of claim 1, wherein the outer cam has at least two pits on its top side, and wherein the step of rotating the outer cam to maximize the distance between the locating stud and the edge of the outer cam opening comprises turning a spanner wrench whose prongs are within the pits of the outer cam.

5. The method of claim 4, wherein the inner cam has at least two pits on its top side, the pits on the top of the inner cam being drilled and tapped to accommodate a pulling device,
and wherein the step of rotating the outer cam and the inner cam until they engage comprises turning a spanner wrench whose prongs are within the pits of the inner cam.

6. The method of claim 4, wherein the pits on the top of the outer cam are drilled and tapped to accommodate a pulling device.

7. The method of claim 1, wherein the outer edge of the outer cam has a groove, and wherein the step of screwing a set screw into a set screw hole to press the outer edge of the outer cam comprises engaging the groove of the outer cam.

8. An assembly for bolting a machine to an equipment foundation having at least one bedplate thereon, the machine having at least one machine foot, each machine foot having:
a machine foot bolthole, and
a set screw hole extending between a lateral edge of the machine foot and the machine foot bolthole,
wherein each machine foot is positioned over and contacts one of the at least one bedplates;
the assembly comprising:
an outer cam having an outer cam opening offset from the center of the outer cam, the outer cam configured to fit within the machine foot bolthole;
an inner cam fit within the outer cam opening, the inner cam having an inner cam opening offset from the center of the inner cam, the bottom of the outer edge of the inner cam being chamfered, and the bottom of the inner edge of the inner cam being chamfered;
a set screw configured to extend through the set screw hole to contact the outer edge of the outer cam, thereby pressing the outer cam against the inner cam;

a washer having a diameter greater than the diameter of the outer cam, the top of the inner edge of the washer being chamfered, the bottom of the inner edge of the washer being chamfered, the washer being positioned over the top side of the outer cam and the top side of the inner cam and configured to contact the top side of the machine foot; and an anchor bolt extending through an opening in the washer and the inner cam opening inner cam, and configured to be fastened to the bedplate to secure the machine foot to the bedplate.

9. The assembly of claim 8, wherein the outer edge of the outer cam has a groove.

10. The assembly of claim 9, wherein the outer cam has at least two pits on its top side.

11. The assembly of claim 10, wherein the inner cam has at least two pits on its top side.

12. The assembly of claim 11, wherein the bolt hole of the washer is offset from its center.

13. The assembly of claim 8, wherein the outer cam has at least two pits on its top side.

14. The assembly of claim 13, wherein the inner cam has at least two pits on its top side.

15. The assembly of claim 14, wherein the bolt hole of the washer is offset from its center.

* * * * *